Figure 1:
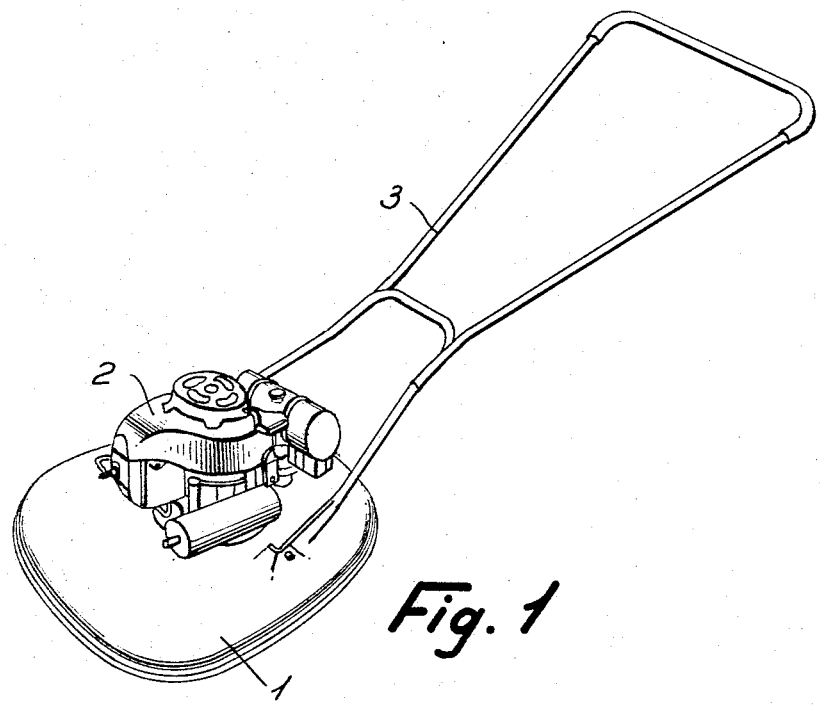

Aug. 29, 1967    S. E. CAMPH    3,338,038
LAWN MOWERS

Filed Oct. 1, 1964    2 Sheets-Sheet 1

INVENTOR.
Sven E. Camph
BY Watson, Cole Grindle & Watson
ATTORNEYS

Aug. 29, 1967  S. E. CAMPH  3,338,038
LAWN MOWERS

Filed Oct. 1, 1964  2 Sheets-Sheet 2

INVENTOR.
Sven E. Camph
BY
Watson, Cole, Grindle & Watson
ATTORNEYS

United States Patent Office 3,338,038
Patented Aug. 29, 1967

3,338,038
LAWN MOWERS
Sven Erik Camph, Malmo, Sweden, assignor to Flymo Societe Anonyme, Geneva, Switzerland
Filed Oct. 1, 1964, Ser. No. 400,690
1 Claim. (Cl. 56—25.4)

This invention relates to a lawn mower of the type comprising a motor driven vertical shaft carrying a horizontally rotating knife and a blower for sucking in air from above and expelling the air into a hood surrounding said knife and said blower, thereby to support the lawn mower on a cushion of air by ground effect during use. Lawn mowers of this type form the object of U.S. Patent No. 3,110,996 and the present invention has to do with improvements of the general type of lawn mowers described and illustrated in the specification of the said U.S. patent.

It is an object of the invention to devise a lawn mower of the type referred to in which the power consumption and weight of the mower is reduced to a minimum without any sacrifice as regards efficient and unobjectionable operation.

It is another object of the invention to devise a lawn mower of the type referred to, in which the lifting of the lawn mower from the ground during operation is limited to a value offering good protection of the operator against injury by eject stones etc.

It is a further object of the invention to devise a lawn mower of the type referred to, in which the blower is with certainty capable of keeping the mower lifted as long as the motor is not stalled by the grass cutting operation.

It is a still further object of the invention to devise a lawn mower of the type referred to, which is suitable for use even on relative soft ground.

It is a still further object of the invention to devise a lawn mower of the type referred to, in which the danger of clogging of the blower is reduced to a minimum.

With these objects in view, according to one aspect of the invention, the said blower has a size such that at the number of revolutions, at which its driving motor has its maximum torque, the air pressure produced by the blower, when extremely low amounts of air are delivered per time unit (blocked air delivery opening), slightly exceeds the total weight of the lawn motor divided by the ground area against which the air is pressed.

It is common practice to run power driven equipment at speeds somewhat greater than the speed at which the motor has its greatest torque. Thus it is obtained that if the motor decreases its speed owing to a too great resistance it will be able to overcome such resistance—at least to some degree. In the present case the blower has such dimensions that it will be able to produce an air cushion at any speed at which the engine is able to do the cutting work.

It is, of course, of great importance that the delivered amount of air is sufficient to keep the lawn mower at a constant height above the ground. This may be difficult as the impeller could be clogged by leaves or clogged grass. It has been found that an air filter is of no use in this connection, as it will be clogged in a few minutes.

According to another aspect of the present invention, this problem is solved by constructing the blower in the form of a disc having wings extending from one side thereof only and being mounted adjacent to the air intake opening in the hood. Such a blower wheel is able to convey an air flow in which a large amount of grass, sticks and leaves is present. It is not necessary to use any kind of air filter.

Figure 2:
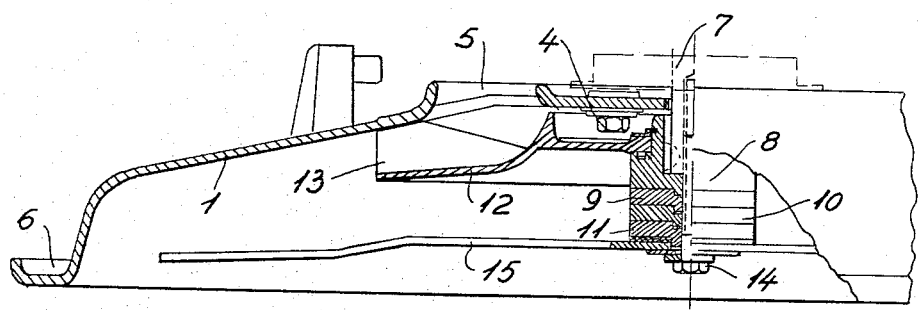
Figure 3:
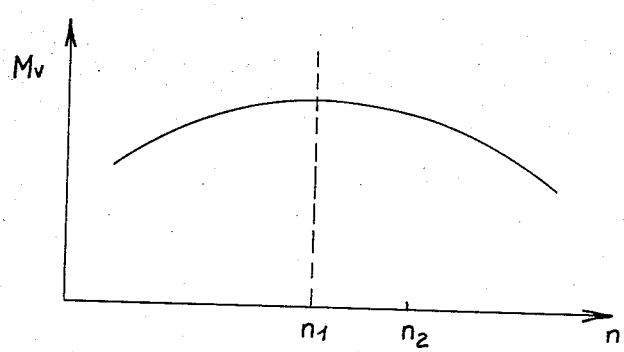
Figure 4:
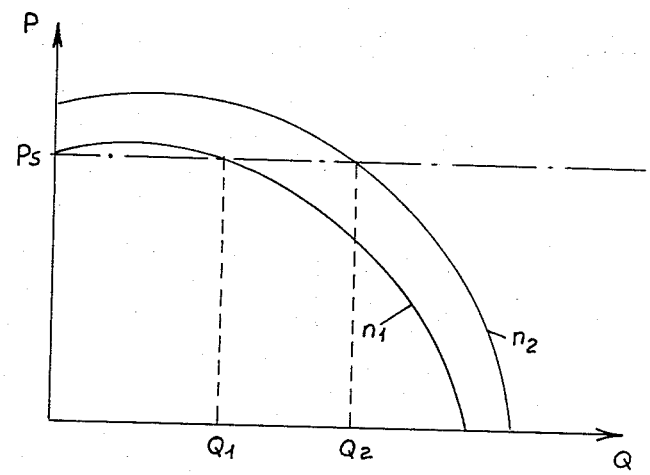

Further features and objects of the invention will be apparent to those skilled in the art from the following detailed description with reference to the accompanying drawings, in which FIG. 1 is a perspective view of a mower according to the invention, FIG. 2 is a vertical cross section through the mower of FIG. 1, the motor being omitted, FIG. 3 is a graph showing the variations in the torque, $M_v$, of the motor as plotted against its speed, $n$, and FIG. 4 is a graph showing the variations in the pressure, P, delivered at two different speeds of the blower wheel, In FIG. 1 a hood serving as a frame of the mower has been designated by reference numeral 1 and includes the usual top wall and integral depending skirt. An internal combustion engine 2 is mounted on the hood 1 which is also provided with a pivotally mounted handle 3.

As shown in FIG. 2, the engine is mounted by bolts 4 on the hood 1. The hood has an air intake opening 5 near its top and a rim flange 6 at its bottom. The vertical shaft of the engine is designated by 7 and fixedly carries four discs 8, 9, 10 and 11 of which the disc 8 is adapted to support a blower wheel or radial fan for rotation with said shaft 7, which fan comprises a disc shaped bottom 12 and a number of radially extending wings 13 mounted on the upper side thereof. As can be seen in FIG. 2, the wings 13 extend upwardly from the bottom 12 and terminate adjacent the hood with the radially inward tips of the wings being positioned adjacent the air intake 5. Between the lower disc 11 and a bolt 14 a knife 15 is clamped for rotation with said shaft also. The knife 15 is of the type generally used in the known types of wheel supported lawn mowers.

After the start of the engine 2 the blower wheel 12, 13 will generate an air pressure in the chamber limited by the hood 1 and the ground on which the rim 6 is resting. As soon as the pressure generated exceeds the weight of the mower divided by the area limited by the rim 6, the lawn mower will rest upon an air cushion.

The speed governor of the engine is set at a number of revolutions $n_2$ per second which is greater than the speed $n_1$ at which the maximum torque is obtained, see FIG. 3. In FIG. 4 the curve designated $n_2$ shows the variations in air pressure according to varying delivered amounts of air per time unit. $P_s$ is the pressure corresponding to the weight of the mower divided by the area defined by the rim 6. The air pressure delivered by the blower wheel cannot substantially exceed this value as an increase in pressure would cause an increase of the flow of air. The pressure delivered cannot be below said value $P_s$ as long as the air cushion should be able to support the mower.

If the mower meets unusually great resistance (e.g. higher grass), the speed of the engine may decrease from the value $n_2$ to the value $n_1$ without causing stalling of the engine and without loosing the supporting air cushion. Of course, the blower wheel could be made bigger so that the air cushion could be created even at lower speeds than $n_1$, but as will be seen from FIG. 3, the speed $n_1$ is in any case the lower limit at which the operation at full torque is possible. Thus an impeller wheel of greater diameter will result in loss of power and an increase in distance between the rim 6 and the ground. Such increase is not wanted from a safety point of view.

Thus, it will be realized that a lawn mower has been provided which is able to slide above the ground—the lawn—in a small and constant height and simultaneously to carry out the grass cutting operation. Such a lawn mower will be very easy to move around on the lawn and the surrounding hood will offer a much better degree of safety than hitherto has been obtained with lawn mowers supported on wheels. The said hood may be spaced only 5 millimetres from the ground and thus stones, which may be struck by the knife, cannot pass under the hood and damage e.g. the feet of the person moving the lawn mower. The cutting knife may also be adapted to cut at extremely low cutting heights without the risk of cutting the turf of the lawn. Furthermore, it will be possible with such a mower to cut lawns which are too soft to be cut by conventional lawn mowers. This is because of the low specific air pressure carrying the mower.

I claim:

In a lawn mower to be supported on a cushion of air by ground effect including a hood having a top wall and an integral depending skirt, said skirt having a peripheral rim located substantially in a plane defining an open bottom of said hood, an air intake formed in said upper wall, a motor carried by said hood, said motor including a vertical shaft extending downwardly within said hood, and a rotary cutter mounted on said shaft for rotation therewith to effect cutting of the grass, the improvement comprising a radial discharge fan within said hood carried by said shaft for rotation therewith to generate said cushion of air around said rim, said fan including a disc member extending radially outwardly from said shaft and in spaced relationship to said top wall, a series of air impelling wings extending upwardly from said disc member and terminating adjacent said top wall thereby forming upwardly open cells confined by said top wall, the radially inward tips of said wings being positioned adjacent said air intake, whereby air is drawn through said intake and said open cells and freely directed radially outwardly along said upper wall by said fan such as to resist clogging of the same by grass clippings and foreign matter.

References Cited

UNITED STATES PATENTS 3,110,996  11/1963  Dahlman _____ 56—25.4
3,170,276  2/1965  Hall _____ 56—25.4

ABRAHAM G. STONE, *Primary Examiner.*

ANTONIO F. GUIDA, *Examiner.*